(12) United States Patent
Yang et al.

(10) Patent No.: US 9,135,946 B1
(45) Date of Patent: Sep. 15, 2015

(54) STEP MOTOR

(71) Applicants: Hyun-Ki Yang, Incheon (KR); Seong-Kwan Oh, Incheon (KR); Hyok-Sang Ahn, Incheon (KR); Se-Hee Park, Incheon (KR)

(72) Inventors: Hyun-Ki Yang, Incheon (KR); Seong-Kwan Oh, Incheon (KR); Hyok-Sang Ahn, Incheon (KR); Se-Hee Park, Incheon (KR)

( * ) Notice: Subject to any disclaimer, the term of this patent is extended or adjusted under 35 U.S.C. 154(b) by 0 days.

(21) Appl. No.: 14/645,649

(22) Filed: Mar. 12, 2015

(51) Int. Cl.
  *G11B 19/20* (2006.01)
(52) U.S. Cl.
  CPC .................. *G11B 19/2009* (2013.01)
(58) Field of Classification Search
  CPC ........... G11B 19/2009; G11B 19/2036; G11B 17/225; G11B 2007/0013; G11B 17/0284; G11B 17/056
  USPC ........................................................ 720/663
  See application file for complete search history.

(56) References Cited

U.S. PATENT DOCUMENTS 5,844,394 A * 12/1998 Mushika et al. .............. 318/696
7,675,832 B2 * 3/2010 Ono et al. ................ 369/112.01

* cited by examiner

*Primary Examiner* — Mark Blouin
(74) *Attorney, Agent, or Firm* — John K. Park; Park Law Firm

(57) ABSTRACT

The present invention relates to a PM (Pulse-Width Modulation) type step motor used for conveying an optical pickup lens of media devices or a mobile camera lens. In detail, the present invention relates to a step motor that is composed of a stator, a rotor rotating by interacting with the stator, a lead screw combined with the rotor and rotating with the rotation of the rotor, and a bearing supporting the lead screw and which can perform precise conveying because it can perform fine adjustment and of which the operation state can be precisely sensed by having a position correcting unit that moves the lead screw to a desired position by finely moving it while contracting and stretching and a rotation sensing unit that is disposed at a side of the rotor or a rotary member rotating with the rotor and senses rotation of the rotor.

11 Claims, 11 Drawing Sheets

STEP MOTOR

CROSS REFERENCE TO RELATED APPLICATION(S)

This application claims the benefit of Korean Patent Application Nos. 10-2014-0028827, 10-2014-0028829, and 10-2014-0028840, filed on Mar. 12, 2014, which are hereby incorporated by reference in its entirety into this application.

BACKGROUND OF THE INVENTION

1. Field of the Invention

The present invention relates to a PM (Pulse-Width Modulation) type step motor used for transferring an optical pickup lens or a mobile camera lens of media devices. In detail, the present invention relates to a step motor that is composed of: a stator, a rotor rotating by interacting with the stator, a lead screw combined with the rotor and rotating with the rotation of the rotor, and a bearing supporting the lead screw, which can perform precise transfer because it can perform fine adjustment; and of which the operation state can be precisely sensed by having a position compensator that moves the lead screw to a desired position by finely moving it while contracting and expanding, and a rotation sensing unit which is disposed at a side of the rotor (or a rotary body rotating with the rotor) and senses rotation of the rotor.

2. Description of the Related Art

In general, PM type small-sized step motors used for transferring an optical pickup lens or a camera lens of media devices are used for parts required to control positions such as precise pick-up of an ODD (Optical Disk Drive) or adjustment of the focus of a camera lens.

These step motors can precisely transfer an object, using a lead screw or a gear which has uniform pitches and is disposed at the output side.

Further, with increasing technical development, as various devices have been increasingly manufactured with high precision to be small, there is a need for the ability to more precisely transfer those devices. Thus, for this purpose, there is a need for a step motor having higher driving resolution.

An 'apparatus for driving lens of optical pick-up' has been disclosed in Korean Patent No. 10-0632598 and it uses a method of reducing the pitch of a lead screw in sections requiring high precision.

However, it is required to reduce the pitch of a lead screw of a step motor in order to increase resolution for transferring an object, but it is practically difficult to manufacture a lead screw with a pitch of about 0.15 mm or less in mass production due to a mechanical limit in manufacturing.

Accordingly, there is a limit in precise transfer of an object only by reducing the pitch of a lead screw of a step motor.

Further, since there is no part for precisely sensing the operation of a step motor, there is a limit in improving the transfer resolution for an object to be transferred by the step motor.

The foregoing is intended merely to aid in the understanding of the background of the present invention, and is not intended to mean that the present invention falls within the purview of the related art that is already known to those skilled in the art.

DOCUMENTS OF RELATED ART (Patent Document 1) Korean Patent No. 10-0632598

SUMMARY OF THE INVENTION

Accordingly, the present invention has been made keeping in mind the above problems occurring in the related art, and the present invention is intended to propose a step motor that is composed of a stator, a rotor rotating by interacting with the stator, a lead screw combined with the rotor and rotating with the rotation of the rotor, and a bearing supporting the lead screw, that can perform precise transfer because it can perform fine adjustment, and of which the operation state can be precisely sensed, by having a position compensator that moves the lead screw to a desired position by finely moving it while contracting and expanding.

Further, the present invention provides a step motor of which the operation state can be precisely sensed, by having a rotation sensing unit that is disposed at a side of the rotor or a rotary body rotating with the rotor and senses rotation of the rotor.

In order to achieve the above object, according to one aspect of the present invention, there is provided a step motor that includes: stators; a rotor rotating by interacting with the stators; a lead screw combined with the rotor and rotating with rotation of the rotor; and a bearing supporting the lead screw, and that further includes a position compensator moving the lead screw to a desired position by finely changing a position of the lead screw while contracting and expanding.

The position compensator may be disposed on a cross-section of the bearing rotatably supporting a first end portion of the lead screw or on a first end of the lead screw.

The position compensator may be disposed at any one of the inside or the outside of a bracket supporting the bearing.

The step motor may further include a fixing member fixing the position compensator, in which the position compensator is retained outside the bracket by the fixing member.

The bracket may be fixed to an assembly structure and the position compensator may be disposed on a side of the assembly structure, so when a position of the assembly structure may be compensated for, the position of the lead screw may be adjusted.

The position compensator may include a displacement generating member that is a piezoelectric element and a displacement amplifying member, and the displacement amplifying member may have a fixing portion, a movable portion, and a flat portion.

According to another aspect of the present invention, there is provided a step motor that includes: stators; a rotor rotating by interacting with the stators; a lead screw combined with the rotor and rotating with rotation of the rotor; and a bearing supporting the lead screw, and that further includes a rotation sensing unit disposed at a side by the rotor or a rotary member rotating with the rotor and sensing rotation of the rotor.

The rotation sensing unit may be disposed at a side by a magnet and may sense rotation of the rotor by sensing rotation of the magnet.

The rotation sensing unit may sense rotation of the rotor by sensing a change in magnetic force of the magnet, using a magnetic force sensor that senses a change in magnetic force of the magnet, and the magnetic force sensor may sense one or more of alternation of an N-pole and an S-pole or alternation of N-non-pole or S-non-pole due to rotation of the magnet.

The rotation sensing unit may be disposed at a side by a rotary body rotating with the rotor and senses rotation of the rotor by sensing the shape of the rotor, and the rotary body may be a rotating member that is a separate part rotating at the same speed as the rotor.

According to a further aspect of the present invention, there is provided a step motor that includes: stators; a rotor rotating by interacting with the stators; a lead screw combined with the rotor and rotating with rotation of the rotor; and a bearing supporting the lead screw, and that further includes: a rotation sensing unit disposed at a side by the rotor or a rotary member rotating with the rotor and sensing rotation of the rotor; and a position compensator moving the lead screw to a desired position by finely changing a position of the lead screw while contracting and expanding.

The step motor according to the present invention includes a position compensator moving a lead screw to a desired position by changing the position of the lead screw while contracting and expanding in a step motor that is used for equipment requiring a precise transfer ability such as transfer of an optical pickup lens or a mobile camera lens of media devices, such that it is possible to finely adjust the lead screw at the level of several micrometers. Accordingly, it is possible to achieve precise position compensation and position control at the level of several micrometers required by industrial fields such as the precise optical device field.

Further, since the present invention includes a rotation sensing unit disposed at a side by the rotor or a rotary body rotating with the rotor and sensing rotation of the rotor, it is possible to precisely sense the operation state of a motor, and accordingly, it is possible to sense a transfer difference and feeds back compensation of a position for the features of a step motor used in an open loop control type, such that it is possible to perform ultrafine adjustment using the step motor.

Further, according to the present invention, when a rotary body of the step motor generates a difference from an actual transfer movement from a required position, it is possible to minimize the difference by precisely sensing the difference and compensating it.

Since the present invention includes a position compensator moving the lead screw to a desired position by finely changing a position of the lead screw while contracting and expanding and a rotation sensing unit disposed at a side by the rotor or a rotary member rotating with the rotor and sensing rotation of the rotor, it is possible to precisely sense the operation state of a motor and finely adjust a lead screw at the level of several micrometers, so it is possible to perform precise position compensation using the step motor and achieve position control at the level of several micrometers required by industrial fields such as the precise optical device field.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
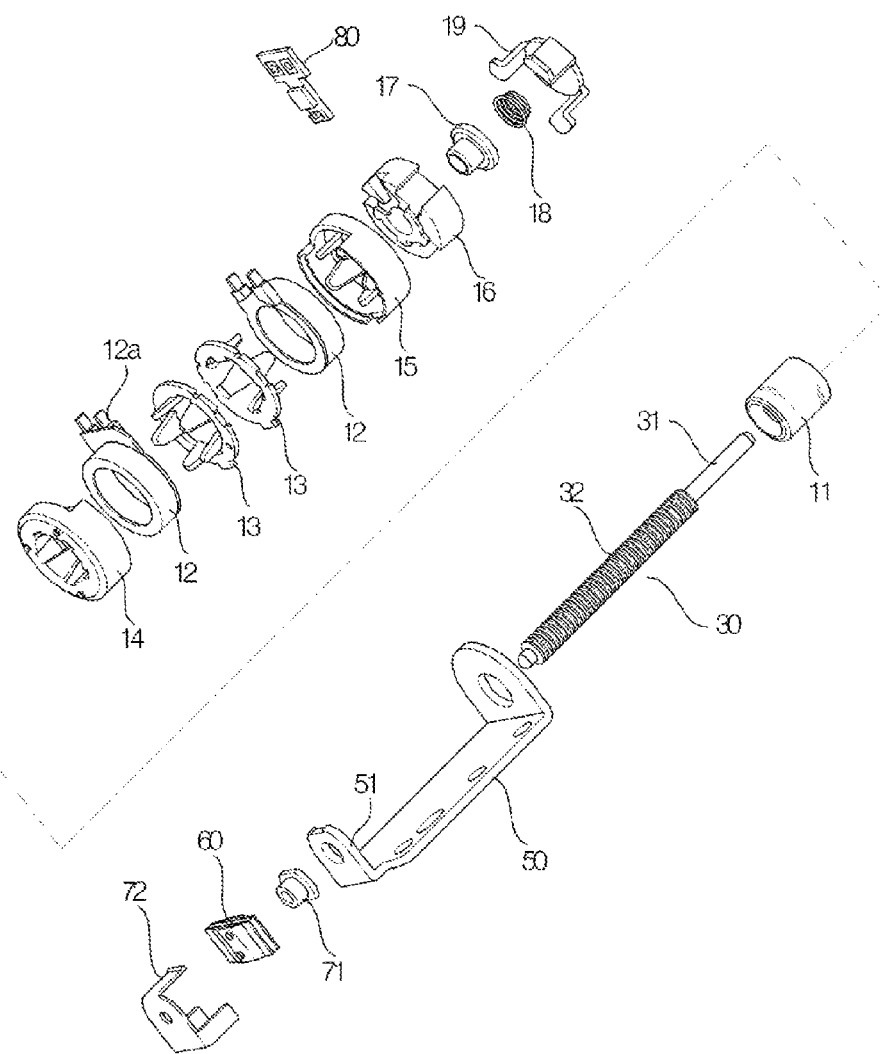
FIG. 1 is an exploded perspective view of a step motor according to an embodiment of the present invention.

A step motor according to the present invention will be described hereafter in detail with reference to the accompanying drawings.

A step motor according to the present invention is described with reference to FIGS. 1 to 3.

The step motor according to the present invention is a common step motor including a lead screw in a motor unit and the detailed configuration is as follows.

A step motor according to an embodiment of the present invention may include: a motor unit 10 including stators that are each composed of a bobbin 12 holding a coil generating magnetism when a power is supplied from the outside and a yoke 13 with a plurality of yoke teeth for engaging with the bobbin 12, cases 14 and 15 that cover and protect the stators, and a magnet 11 that is inserted inside the stator and rotates by interacting with the stators; a lead screw 30 combined with a rotor, converting torque of the rotor into a straight motion, and transmitting the straight motion to the outside; and a bracket 50 for fixing the motor unit. The step motor may further include a rotation sensing unit that senses rotation of the rotor, using a magnetic force.

The stators, as shown in FIG. 1 as an embodiment, are composed of two bobbins 12 holding a coil that generates magnetism when power is supplied from the outside and two yokes 13 combined with the bobbins 12, respectively, and face each other. Terminals 12a are formed at the upper portion of the bobbins 12.

The rotor has a structure in which the magnet 11 magnetized with N-poles and S-poles alternately arranged around the outer side and having a predetermined size is inserted inside the stators and rotates by interacting with the stators and the lead screw 30 has a magnet mount portion 31 inserted and fixed inside the magnet 11 and a threaded portion 32 for converting torque of the rotor into a straight motion.

The bracket 50 is formed substantially in a U-shape having a motor unit seat for supporting a side of the motor unit 10, a horizontal fixing side for fixing the motor unit 10, and a lead screw support side 51 for supporting a first end portion of the lead screw 30, and a bearing 71 for rotatably supporting the first end of the lead screw 30 is disposed on the lead screw support side 51.

A center guide 17 supporting a second end portion of the lead screw 30, a centering member 16 guiding the position of the center guide 17, and an elastic member 18 axially pushing the center guide 17 are disposed on the second end portion of the lead screw 30, Instead of the center guide 17, a bearing (not shown) may be disposed on the second end portion of the lead screw 30 so that both end portions of the lead screw 30 can be rotatably supported by the bearings.

A power transmission member (not shown) such as a nut that is combined with an object and moves straight to transfer the object may be disposed on the lead screw 30, and a position compensator 60 moving the lead screw 30 to a desired position by finely adjusting the position of the lead screw 30 may be further provided. The position compensator 60, as shown in FIGS. 2 and 3, may further has a fixing member 72 that can fix the position compensator 60 outside the lead screw support side 51, so that the position compensator 60 can be retained outside the bracket 50 by the fixing member 72.

The step motor according to the present invention includes the position compensator 60 that moves the lead screw 30 to a desired position by finely changing the position of the lead screw while contracting and expanding in the structure described above.

Figure 3:
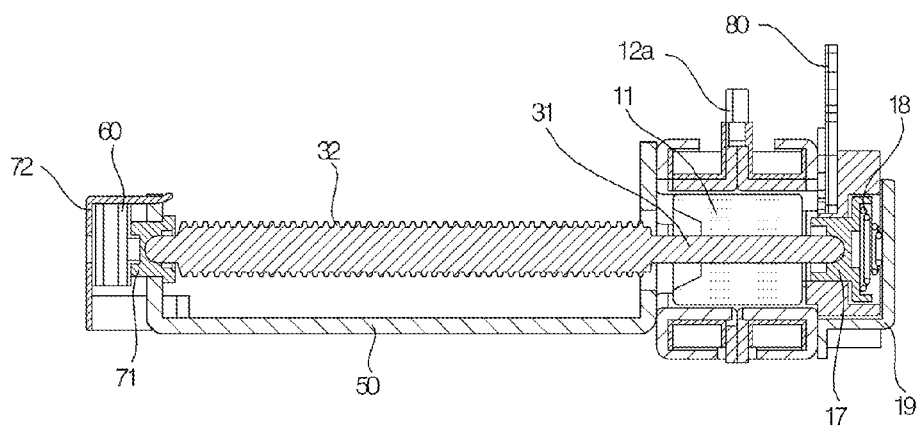
FIG. 3 is a cross-sectional view of the step motor according to an embodiment of the present invention.
Figure 4A:
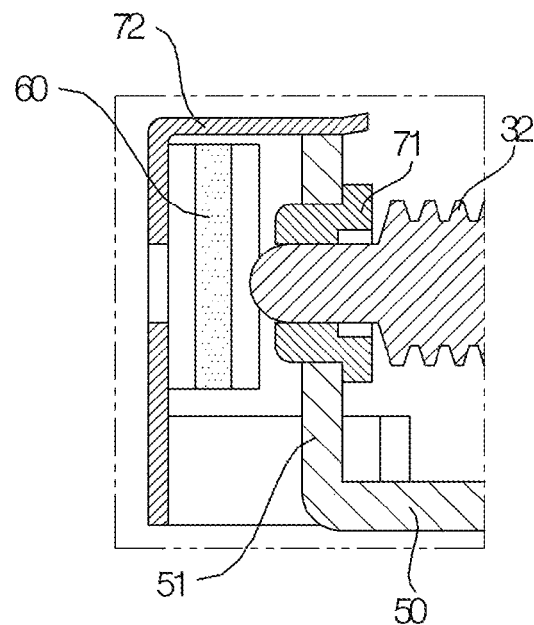
FIGS. 4A to 4C are enlarged views showing end portions of a lead screw of the step motor according to an embodiment of the present invention.
Figure 4B:
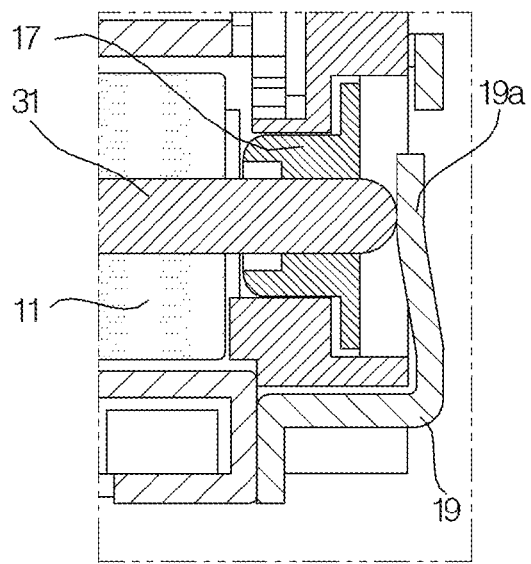

The position compensator 60 is disposed on the cross-section of the bearing 71 rotatably supporting the first end portion of the lead screw, as shown in FIG. 3, or it is disposed on a first end of the lead screw 30, as shown in FIG. 4A, and it finely compensates the axial position of the lead screw 30.

At least one of both end portions of the lead screw 30 is inserted through the bearing and rotatably supported, as shown in FIG. 4A.

Figure 2:
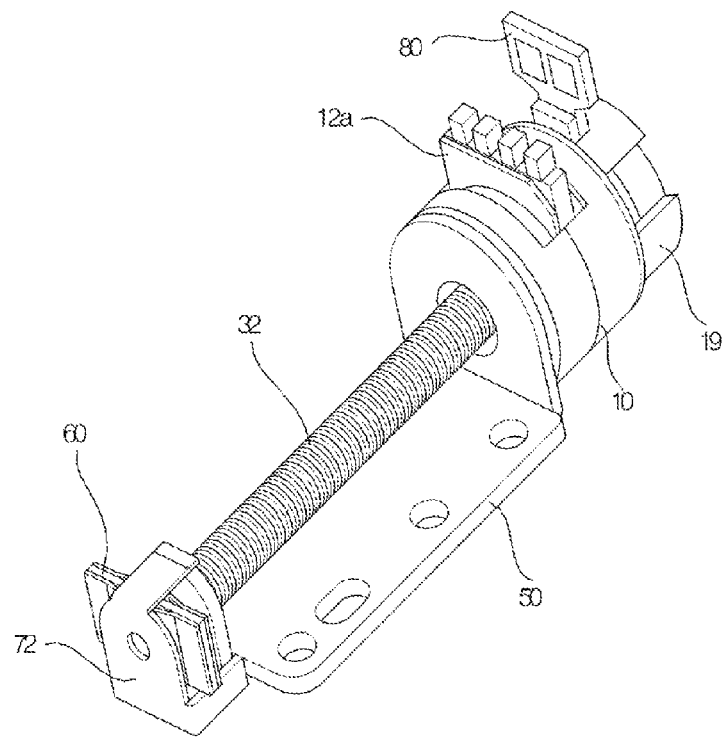
FIG. 2 is a perspective view showing the external appearance of the step motor according to an embodiment of the present invention.
Figure 5:
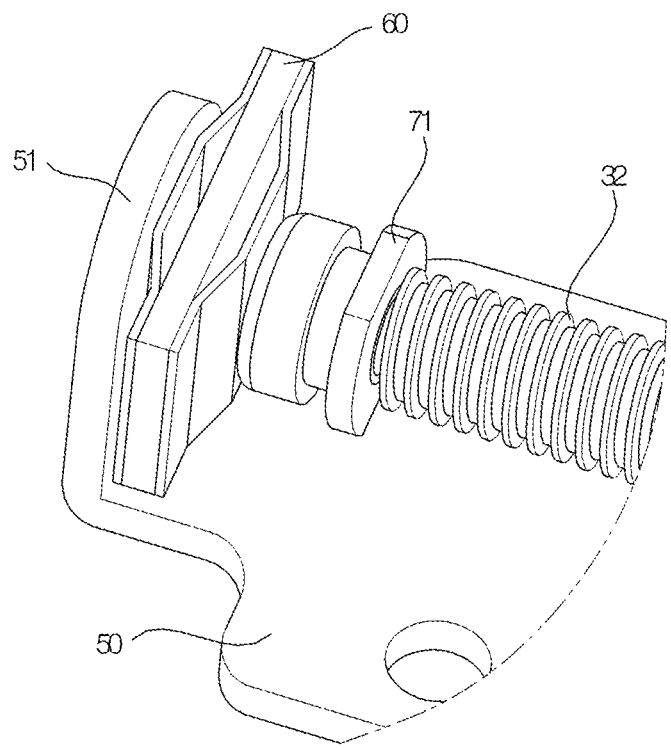
FIG. 5 is a view showing in detail a position compensator according to an embodiment of the present invention.

The position compensator 60, as shown in FIGS. 2 and 3, may be disposed outside the lead screw support side 51 of the bracket 50 that supports the bearing 71, or it may be disposed inside the lead screw support side 51 of the bracket 50, as shown in FIG. 5.

The position compensator 60, as shown in FIGS. 2 and 3, may further has the fixing member 72 that can fix the position compensator 60 outside the lead screw support side 51, so that the position compensator 60 can be retained outside the bracket 50 by the fixing member 72.

Figure 4C:
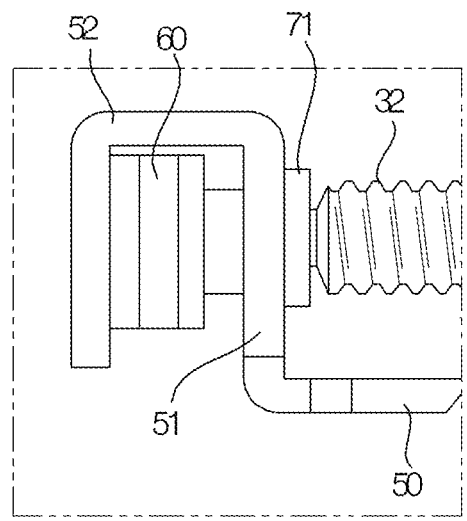

As another example in which the position corrector 60 is disposed outside the lead screw support side 51 of the bracket 50, as shown in FIG. 4C, a bracket extension 52 that expands in an inversed L-shape at the end of the lead screw support side 51 of the bracket 50 may be formed instead of the fixing member 72 to support the position compensator 60 with its vertical inner side.

Figure 6:
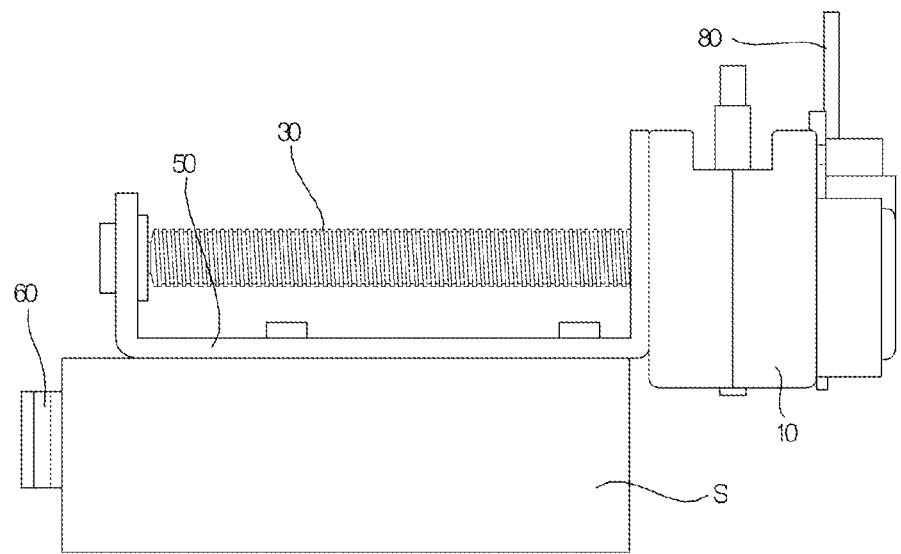
FIG. 6 is a view showing the position compensator disposed in an assembly structure.

As another example of compensating the position of the lead screw 30, as shown in FIG. 6, the bracket 50 may be fixed to an assembly structure S and the position compensator 60 is disposed on a side of the assembly structure S so that the position of the assembly structure S is compensated for by the position compensator 60 and the position of the lead screw 30 is adjusted accordingly.

Figure 7:
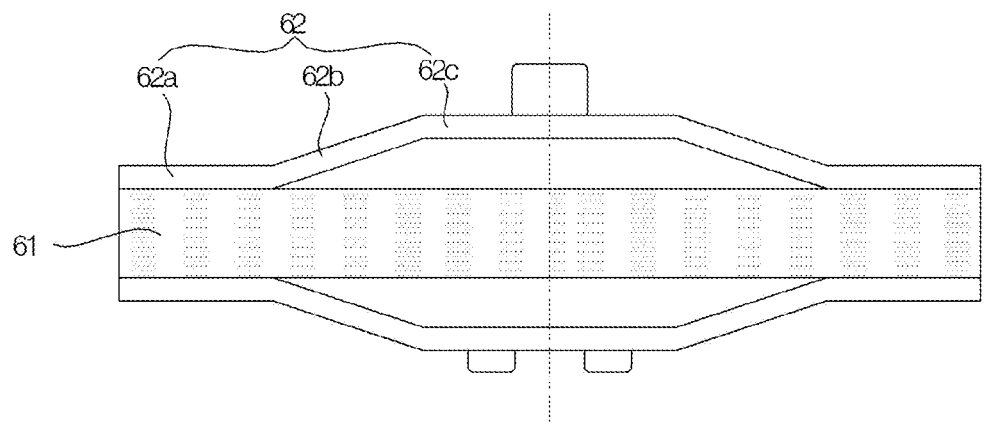
FIG. 7 is a cross-sectional view showing in detail the position compensator in the step motor according to an embodiment of the present invention.

The position compensator 60 is, as shown in FIG. 7, composed of a displacement generating member 61 that is a piezoelectric element and displacement amplifying members 62 on and beneath the displacement generating member 61 and the displacement amplifying members 62 are each composed of a fixing portion 62a, a movable portion 62b, and a flat portion 62c. The displacement of the piezoelectric element that is the displacement generating member 61 is very difficult to industrially use, so the displacement amplifying members 62 are specifically provided in the present invention.

Figure 8A:
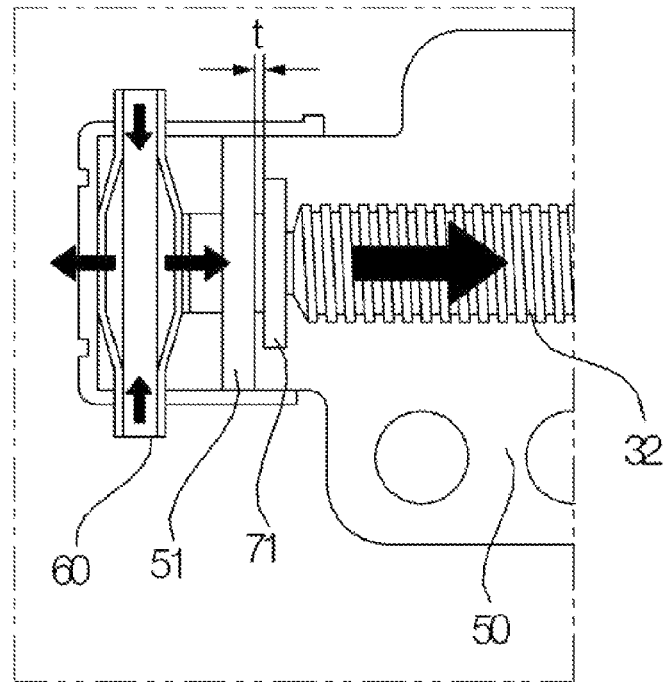
FIGS. 8A and 8B are views illustrating operation of the position compensator in the step motor according to an embodiment of the present invention.
Figure 8B:
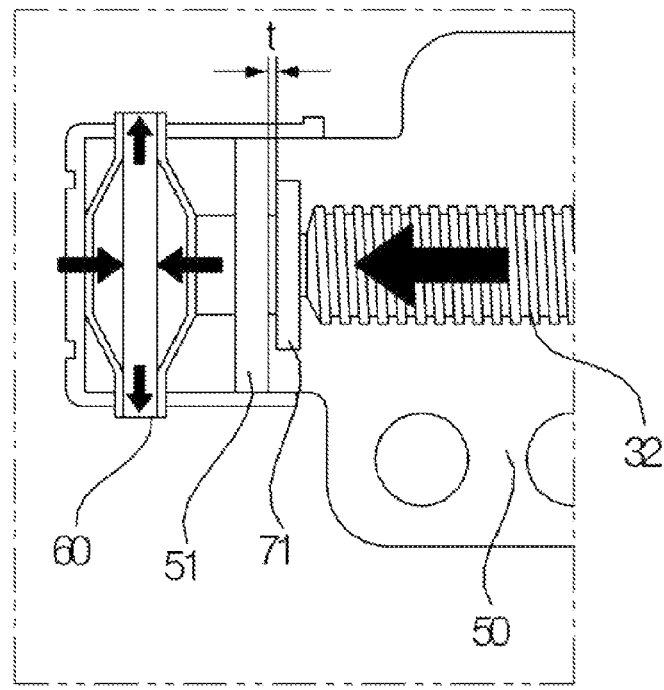

The position compensator 60 generates displacement by laterally contracting or expanding, as shown in FIGS. 8A and 8B, when a voltage is supplied to the piezoelectric element that is the displacement generating member 61. In this case, the piezoelectric element that is the displacement generating member 61 generate longitudinal displacement little, so longitudinal displacement is generated by the displacement amplifying members connected to the piezoelectric element that is the displacement generating member 61. The piezoelectric element that is the displacement generating member 61 generates displacement proportioned to the intensity of an input voltage, and a voltage to be applied from the outside may be about 60~100V in the present invention, in which the displacement of the piezoelectric element that is the displacement generating member 61 is about 5~15 μm.

The displacement amplifying members 62 each have the fixing portion 62a laterally expanding at a predetermined distance from an end of the displacement generating member 61, the movable portion 62b inclining at an obtuse angle from an end of the fixing portion, and the flat portion 62c laterally expanding from an end of the movable portion 62b, and have two or more bending portions.

As the fixing portion 62a of the displacement amplifying portion 62 contracts in the same direction as the contraction direction of the displacement generating member 61, the flat portion 62c deforms outward perpendicular to the contraction direction of the fixing portion 62a (see FIG. 8A), while as the fixing portion 62a expands in the same direction as the expansion direction of the displacement generating member 81, the flat portion 62c deforms inward perpendicular to the expansion direction of the fixing portion 62b (see FIG. 8B).

That is, as the displacement generating portion 61 contracts and expands, the flat portion 62c axially deforms, so the position of the lead screw 30 can be finely adjusted.

The deformation range of the flat portion 62c depends on the angle between the fixing portion 62a and the movable portion 62b and the displacement of the fixing portion 62a, while the displacement of the fixing portion 62a depends on the intensity of a voltage applied to the piezoelectric element that is the displacement generating member 61.

For smooth adjustment of the position of the lead screw 30 by the position compensator 60 in the present invention, as shown in FIGS. 8A and 8B, the lead screw support side 51 of the bracket 50 and the side of the bearing 71 that rotatably supports the first end portion of the leas screw 30 may be spaced at a predetermined distance t, in which the distance t is made larger than the compensation amount for the position of the lead screw 30 adjusted by the position compensator 60.

On the other hand, the step motor according to the present invention includes a rotation sensing unit 80 that is disposed at a side of the rotor or a rotary body rotating with the rotor in the structure described above and senses rotation of the rotor.

Figure 9:
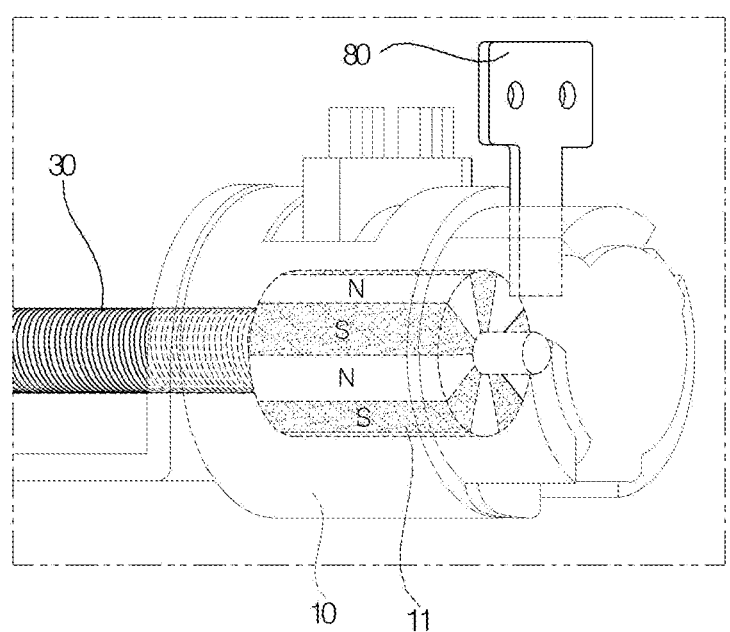
FIG. 9 is a view showing the step motor according to an embodiment of the present invention that has been equipped with a rotation sensing unit.

As shown in FIG. 9, the rotation sensing unit 80 is disposed at a side by the magnet 11 and senses rotation of the rotor by sensing rotate of the magnet 11. In this configuration, the rotation sensing unit 80 senses a change in magnetic force of the magnet 11, using a magnetic force sensor 81 that senses a change in magnetic force of the magnet 11, and analyzes the sensed change in magnetic force of the magnet 11, thereby sensing rotation of the rotor.

The magnetic force sensor 81 senses rotation of the magnet 11 and the rotor by sensing one or more of alternation of an N-pole and an S-pole or alternation of N-non-pole or S-non-pole due to rotation of the magnet 11.

Figure 10A:
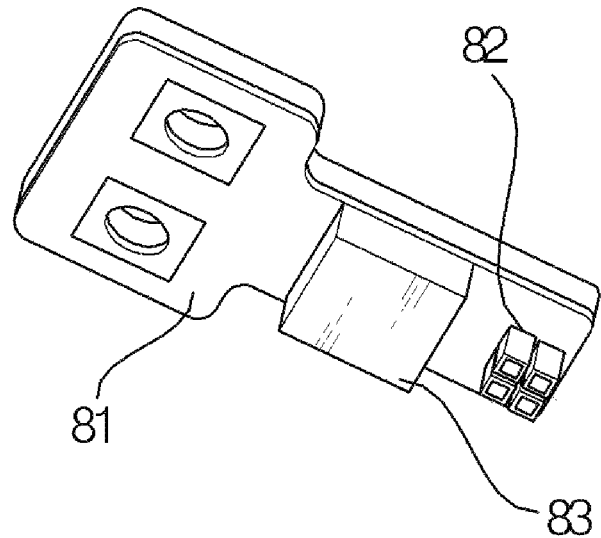
FIG. 10A is a view showing an example in which a magnetic sensor is attached as a magnetic force sensor to a PCB in the present invention and FIG. 10B is a view showing an example in which an FG magnetizing pattern is attached as a magnetic force sensor to an FPCB or a PCB in the present invention.

By attaching a magnetic sensor 81 to a PCB, as shown in FIG. 10A, the magnetic force sensor 81 can sense a change in magnetic force of the magnet 11. The magnetic force sensor 81 with the magnetic sensor 82 may be given a reinforcing member 83 to be easily combined with a counterpart to be combined with the PCB. For example, when the PCB is 1 mm thick and a counterpart is 4 mm thick, the reinforcing member 83 may be provided to remove gap of 3 mm that is generated in combining. Further, the magnetic sensor 82 may be attached to an FPCB instead of the PCB.

The magnetic sensor 82 outputs a sinusoidal voltage by sensing the magnetic force of the magnet 11, when a voltage is applied from the outside, the output voltage is the maximum when an N-pole or an S-pole of the magnet 11 is positioned at the right center of the magnetic sensor 82, and the magnetic sensor 82 outputs a sine waveform proportioned to the rotation of the rotor when the motor is operated. A transfer difference of the motor can be sensed when the sine waveform outputted from the magnetic sensor 82 is disconnected and then outputted again, that is, when the sine waveform is not continuous, and it can be compensated for by a module type drive.

Figure 10B:
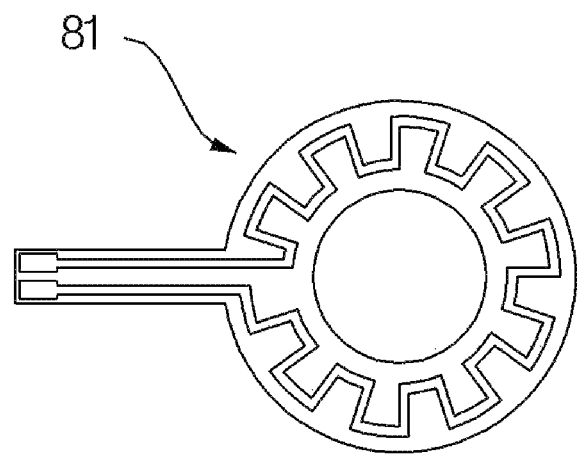

The magnetic sensor 81 may be achieved by an FPCB or a PCB printed with an FG (Frequency Generator) magnetized pattern, as shown in FIG. 10B.

Figure 11A:
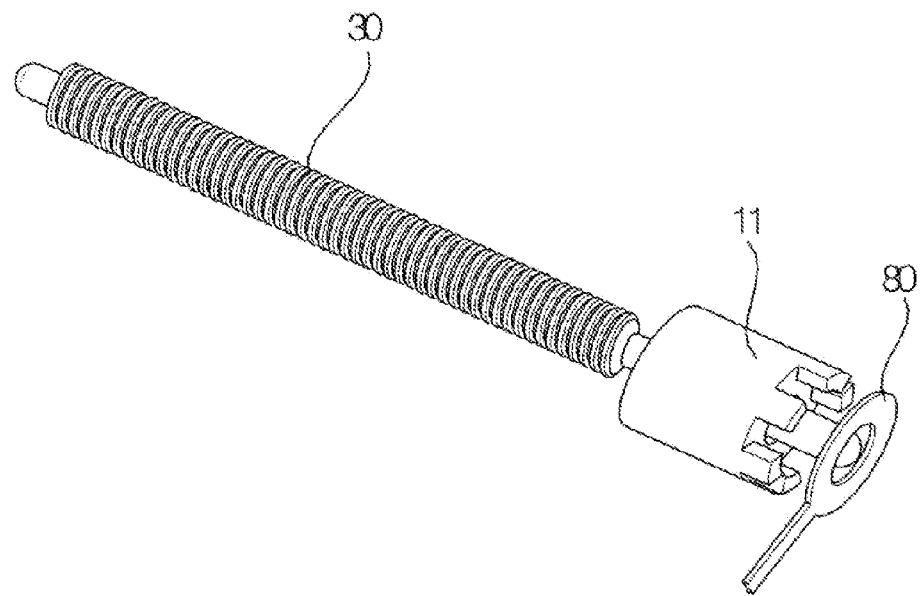
FIG. 11A is a view showing an example in which the rotation sensing unit is disposed on a side of a magnet in the present invention and FIG. 11B is a view showing an example in which the rotation sensing unit is disposed on a side of a rotary body in the present invention.

As another example of the rotation sensing unit 80 in the present invention, as shown in FIG. 11A, the rotation sensing unit 80 may be disposed at a side by the magnet 11 and sense rotation of the rotor by sensing a change in shape of the rotor or a rotary body rotating with the rotor. The rotary body may be the magnet 11 or the lead screw 30 fitted in the magnet 11.

When the rotary body is the magnet 11, prominences and depressions may be formed on the portion of the magnet 11 that faces the rotation sensing unit 80, so that the rotation sensing unit 80 disposed at a side by the magnet 11 can sensing rotation of the rotor by sensing a change of the magnet 11, when the magnet 11 rotates.

Figure 11B:
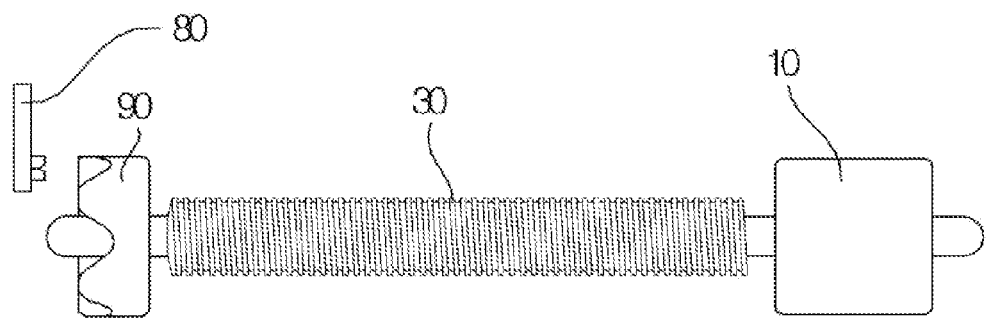

As another example of the rotation sensing unit 80 in the present invention, as shown in FIG. 11B, the rotation sensing unit 80 is disposed at a side by a rotating member 90 that is a separate part as the rotary body rotating with the rotor to sense rotation of the rotor by sensing the shape of the rotary body. The rotating member 90 is a rotary body fitted on the first end portion of the lead screw 30 and rotating at the same speed as the rotor.

The rotating member 90 that is a separate part may be formed in various shapes at the portion facing the rotation sensing unit 80 so that the rotation sensing unit 80 can sense a change in shape.

Figure 12A:
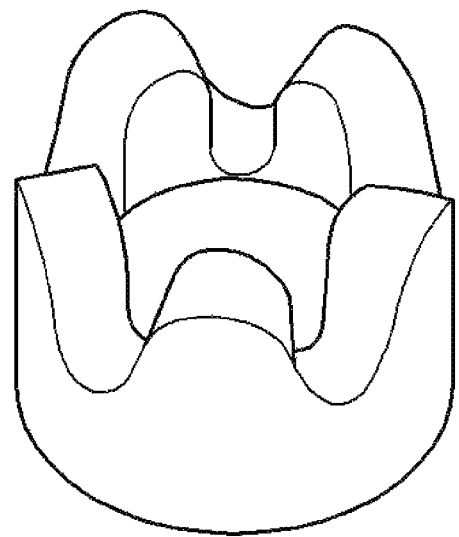
FIGS. 12A to 12D are views showing various examples of the rotary body in the present invention.
Figure 12B:
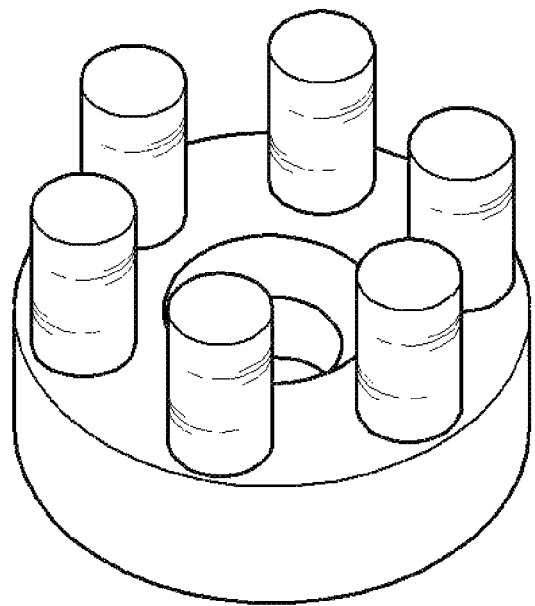
Figure 12C:
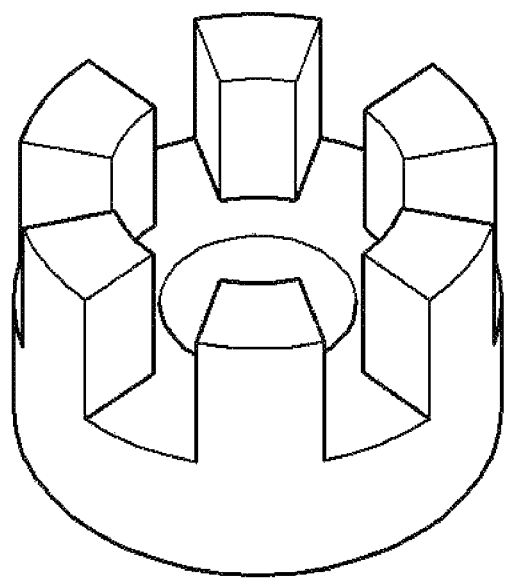
Figure 12D:
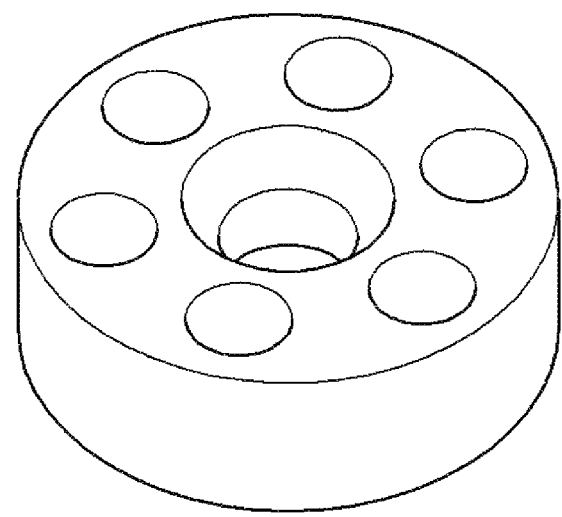

FIGS. 12A to 12D are views showing various embodiments of the rotating member 90, in which the rotating member 90 may have one or more grooves or protrusions (FIGS. 12A to 12C) or one or more holes (FIG. 12D).

Since the rotation sensing unit 80 is provided, it is possible to precisely sense the operation state of the motor, and accordingly, it is possible to sense a transfer difference and feeds back compensation of a position for the features of a step motor used in an open loop control type, such that it is possible to perform ultrafine adjustment using the step motor.

Further, the present invention can include both of a position compensator moving a lead screw to a desired position by finely changing the position of the lead screw while contracting and extending in a step motor and a rotation sensing unit disposed at a side by a rotor or a rotary body rotating with the rotor and precisely sensing rotation of the rotor.

Therefore, it is possible to precisely sense the operation state of a motor and finely adjust a lead screw at the level of several micrometers, so it is possible to achieve precise position compensation and position control at the level of several micrometers required by industrial fields such as the precise optical device field.

Although the present invention was described above with reference to exemplary embodiments, it should be understood that the present invention may be changed and modified in various ways by those skilled in the art, without departing from the spirit and scope of the present invention described in claims.

What is claimed is:

1. A step motor comprising:
   stators;
   a rotor rotating by interacting with the stators;
   a lead screw combined with the rotor and rotating with rotation of the rotor; and
   a bearing supporting the lead screw, and
   further comprising a position compensator moving the lead screw to a desired position by finely changing a position of the lead screw while contracting and expanding.

2. The step motor of claim 1, wherein the position compensator is disposed on a cross-section of the bearing rotatably supporting a first end portion of the lead screw or on a first end of the lead screw.

3. The step motor of claim 1, wherein the position compensator is disposed at any one of the inside or the outside of a bracket supporting the bearing.

4. The step motor of claim 3, further comprising a fixing member fixing the position compensator,
   wherein the position compensator is retained outside the bracket by the fixing member.

5. The step motor of claim 1, wherein the bracket is fixed to an assembly structure and the position compensator is disposed on a side of the assembly structure, so when a position of the assembly structure is compensated for, the position of the lead screw is adjusted.

6. The step motor of claim 1, wherein the position compensator includes a displacement generating member that is a piezoelectric element and a displacement amplifying member, and
   the displacement amplifying member has a fixing portion, a movable portion, and a flat portion.

7. A step motor comprising:
   stators;
   a rotor rotating by interacting with the stators;
   a lead screw combined with the rotor and rotating with rotation of the rotor; and
   a bearing supporting the lead screw, and
   further comprising a rotation sensing unit disposed at a side by the rotor or a rotary body rotating with the rotor and sensing rotation of the rotor.

8. The step motor of claim 7, wherein the rotation sensing unit is disposed at a side by a magnet and senses rotation of the rotor by sensing rotation of the magnet.

9. The step motor of claim 8, wherein the rotation sensing unit senses rotation of the rotor by sensing a change in magnetic force of the magnet, using a magnetic force sensor that senses a change in magnetic force of the magnet, and
   the magnetic force sensor senses one or more of alternation of an N-pole and an S-pole or alternation of N-non-pole or S-non-pole due to rotation of the magnet.

10. The step motor of claim 7, wherein the rotation sensing unit is disposed at a side by a rotary body rotating with the rotor and senses rotation of the rotor by sensing the shape of the rotor, and
    the rotary body is a rotating member that is a separate part rotating at the same speed as the rotor.

11. A step motor comprising:
stators;
a rotor rotating by interacting with the stators;
a lead screw combined with the rotor and rotating with rotation of the rotor; and
a bearing supporting the lead screw, and
further comprising:
a rotation sensing unit disposed at a side by the rotor or a rotary member rotating with the rotor and sensing rotation of the rotor; and
a position compensator moving the lead screw to a desired position by finely changing a position of the lead screw while contracting and expanding.

* * * * *